(12) United States Patent
Lin et al.

(10) Patent No.: US 10,691,227 B2
(45) Date of Patent: Jun. 23, 2020

(54) MOUSE DEVICE

(71) Applicant: Primax Electronics Ltd, Taipei (TW)

(72) Inventors: Yu-Chiang Lin, Taipei (TW); Chun-Nan Su, Taipei (TW); Pei-Luan Yen, Taipei (TW); Hsin-Ju Teng, Taipei (TW); Ting-Yu Liu, Taipei (TW); Cheng-Chih Hsieh, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 61 days.

(21) Appl. No.: 16/144,117

(22) Filed: Sep. 27, 2018

(65) Prior Publication Data

US 2019/0272048 A1 Sep. 5, 2019

Related U.S. Application Data

(60) Provisional application No. 62/637,231, filed on Mar. 1, 2018.

(51) Int. Cl.
*G06F 3/0354* (2013.01)
*G06F 3/02* (2006.01)
*G06F 3/038* (2013.01)

(52) U.S. Cl.
CPC ........ *G06F 3/03543* (2013.01); *G06F 3/0227* (2013.01); *G06F 3/0383* (2013.01); *G06F 2203/0337* (2013.01)

(58) Field of Classification Search
CPC .. G06F 3/03543; G06F 3/0227; G06F 3/0383; G06F 2203/0337
See application file for complete search history.

(56) References Cited

U.S. PATENT DOCUMENTS

| | | | |
|---|---|---|---|
| 2009/0002319 A1* | 1/2009 | Cheng | G06F 3/03543 345/163 |
| 2011/0227828 A1* | 9/2011 | Blandin | G06F 3/03543 345/163 |
| 2019/0220107 A1* | 7/2019 | Odgers | G01L 5/22 |

* cited by examiner

*Primary Examiner* — Muhammad N Edun
(74) *Attorney, Agent, or Firm* — Kirton McConkie; Evan R. Witt

(57) ABSTRACT

A mouse device includes a main body, an air cushion and a first hidden key. The first hidden key is located at a first side of the main body. The air cushion is located under the main body, and contactable with a working surface. The first hidden key is arranged between the main body and the air cushion. The first hidden key is not exposed outside. When the main body is leaned in a first direction and pressed down, the first hidden key is triggered to generate a first leaning signal. The first hidden key can be used to replace the key of the conventional keyboard. Due to the structure of the mouse device, the mouse device can be operated more intuitively.

8 Claims, 3 Drawing Sheets

US 10,691,227 B2

MOUSE DEVICE

CROSS-REFERENCE TO RELATED APPLICATION

This application claims priority to U.S. Provisional Patent Application No. 62/637,231 filed Mar. 1, 2018, the contents of which are incorporated herein by reference.

FIELD OF THE INVENTION

The present invention relates to a mouse device, and more particularly to a mouse device for assisting a user in playing an electronic sports game.

BACKGROUND OF THE INVENTION

A mouse device is one of the widely-used computer peripheral input devices. When a mouse device is held by the palm of a user, the user may move the mouse device to control the movement of a cursor of the computer system. The mouse device complies with the intuitive operating habits of many users. Consequently, the mouse device is the most prevailing input device.

Generally, the functions of electronic sports games become more versatile. The user has to operate a mouse device and a keyboard to play the electronic sports game. Take an electronic sports game "Playerunknown's Battlegrounds" for example. The users have to watch the computer screen with their eyes, and they need to observe whether there are game items or enemies in the surrounding environment to perform corresponding operations. Particularly, this electronic sports game provides the sound of the footsteps of the enemies. The user can hear the sound of the enemies' footsteps through headphones and find the enemies' positions.

In other words, the user has to obtain all kinds of information through the game screen displayed on the computer screen and the sound provided by the headphone so as to determine the game strategy. However, since the game screen is usually diverse and large, the user has to receive too much information. For example, the user needs to pay attention to where there are items to be retrieved, and also needs to pay attention to whether there are enemies nearby. Moreover, when the user concentrates on shooting the enemy, the situation of disregarding the forbidden zone occurs because of the attention shift.

Moreover, when the user plays the electronic sports game "Playerunknown's Battlegrounds", the user may perform a specified operation to execute a specified command. For example, a free look function is executed by pressing the "Alt" key of the keyboard. An auto run function is executed by pressing the "=" key of the keyboard. An inventory access function is executed by pressing the "Tab" key of the keyboard. A map displaying function is executed by pressing the "M" key of the keyboard. An inventory access function is executed by pressing the "Tab" key of the keyboard. A function of leaning the left shoulder is executed by pressing the "Q" key of the keyboard. A function of leaning the right shoulder is executed by pressing the "E" key of the keyboard. A function of shooting weapons is executed by pressing the left button of the mouse device. The function of changing weapons is executed by rotating the scroll wheel of the mouse device. However, if the specified operation is erroneously performed while any of the above functions is executed, a malfunction occurs. For example, when the user intends to press the "Q" key of the keyboard, the "Tab" may be erroneously triggered.

Therefore, the structure and function of the conventional mouse device for the electronic sports game need to be further improved.

SUMMARY OF THE INVENTION

The present invention provides a mouse device capable of executing various functions efficiently. After the mouse device receives an auxiliary signal from an intelligent judgment system, a corresponding warning signal is generated to warn the user of the surrounding condition change.

In accordance with an aspect of the present invention, there is provided a mouse device. The mouse device is in communication with a computer system. The mouse device includes a main body, an air cushion and a first hidden key. The air cushion is located under the main body, and contactable with a working surface. The first hidden key is arranged between the main body and the air cushion. The first hidden key is not exposed outside. The first hidden key is located at a first side of the main body. When the main body is leaned in a first direction and pressed down, the first hidden key is triggered to generate a first leaning signal.

In an embodiment, the mouse device further includes a light-emitting element. The light-emitting element is disposed within the scroll wheel and electrically connected with the control unit. The light-emitting element emits a light beam to provide a first warning function. The control unit is electrically connected with an intelligent judgment system. After the intelligent judgment system reads a game information of an electronic sports game executed by the computer system and analyzes the game information, the intelligent judgment system generates an auxiliary signal and transmits the auxiliary signal to the control unit. According to the auxiliary signal, the control unit drives the light-emitting element to emit a light beam to provide the first warning function.

In an embodiment, the mouse device further includes at least one warning element, which is disposed on the main body and electrically connected with the control unit. When the at least one warning element is driven, a second warning function is provided. The mouse device further includes an intelligent judgment system, which is electrically connected with the control unit. After the intelligent judgment system reads a game information of an electronic sports game executed by the computer system and analyzes the game information, the intelligent judgment system generates an auxiliary signal and transmits the auxiliary signal to the control unit. According to the auxiliary signal, the control unit enables the at least one warning element to provide the second warning function.

From the above descriptions, the mouse device of the present invention is specially designed according to the electronic sports game. For example, the positions of the plural function keys are specially determined, so that the problem of erroneously touching the function keys is avoided. In addition, the first hidden key and the second hidden key are arranged between the main body and the air cushion, so that the mouse device is operated more intuitive. Moreover, the function of the scroll wheel is disabled during the continuous shooting process, so that the problem of erroneously touching the scroll wheel is avoided. Moreover, the cooperation of the mouse device and the intelligent judgment system can provide various warning functions to facilitate the user to play the electronic sports game.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a mouse device. In the following examples, the scenarios of operating the mouse device to play an electronic sports game will be described. It is noted that the applications of the mouse device are not restricted.

Figure 1:
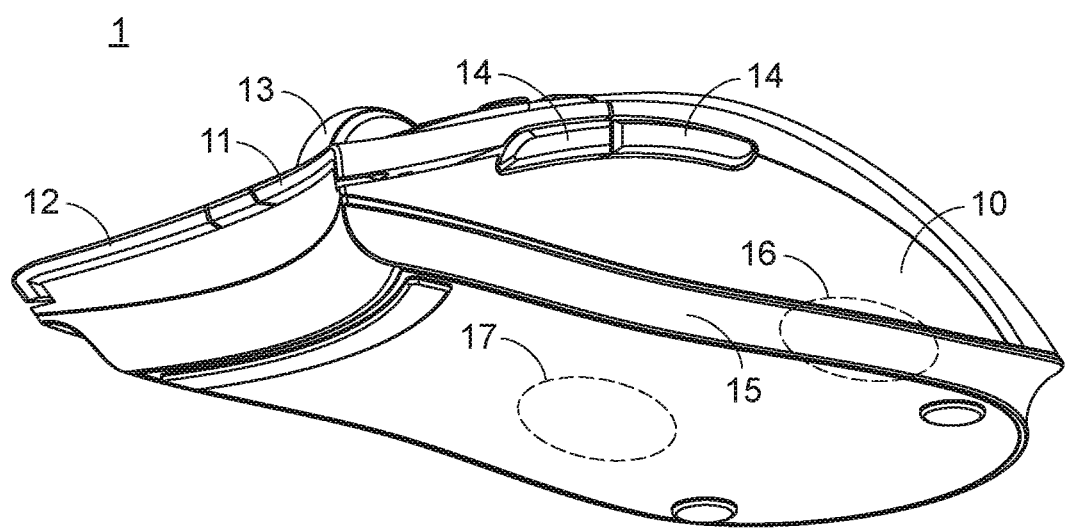
FIG. 1 is a schematic perspective view illustrating the structure of a mouse device according to an embodiment of the present invention and taken along a viewpoint.
Figure 2:
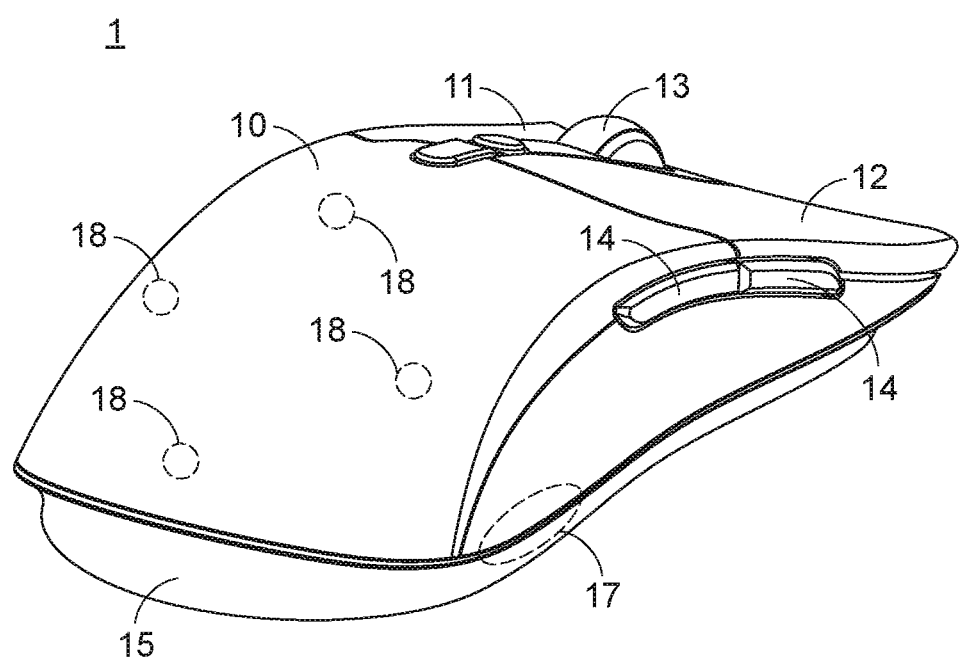
FIG. 2 is a schematic perspective view illustrating the structure of the mouse device according to the embodiment of the present invention and taken along another viewpoint.
Figure 3:
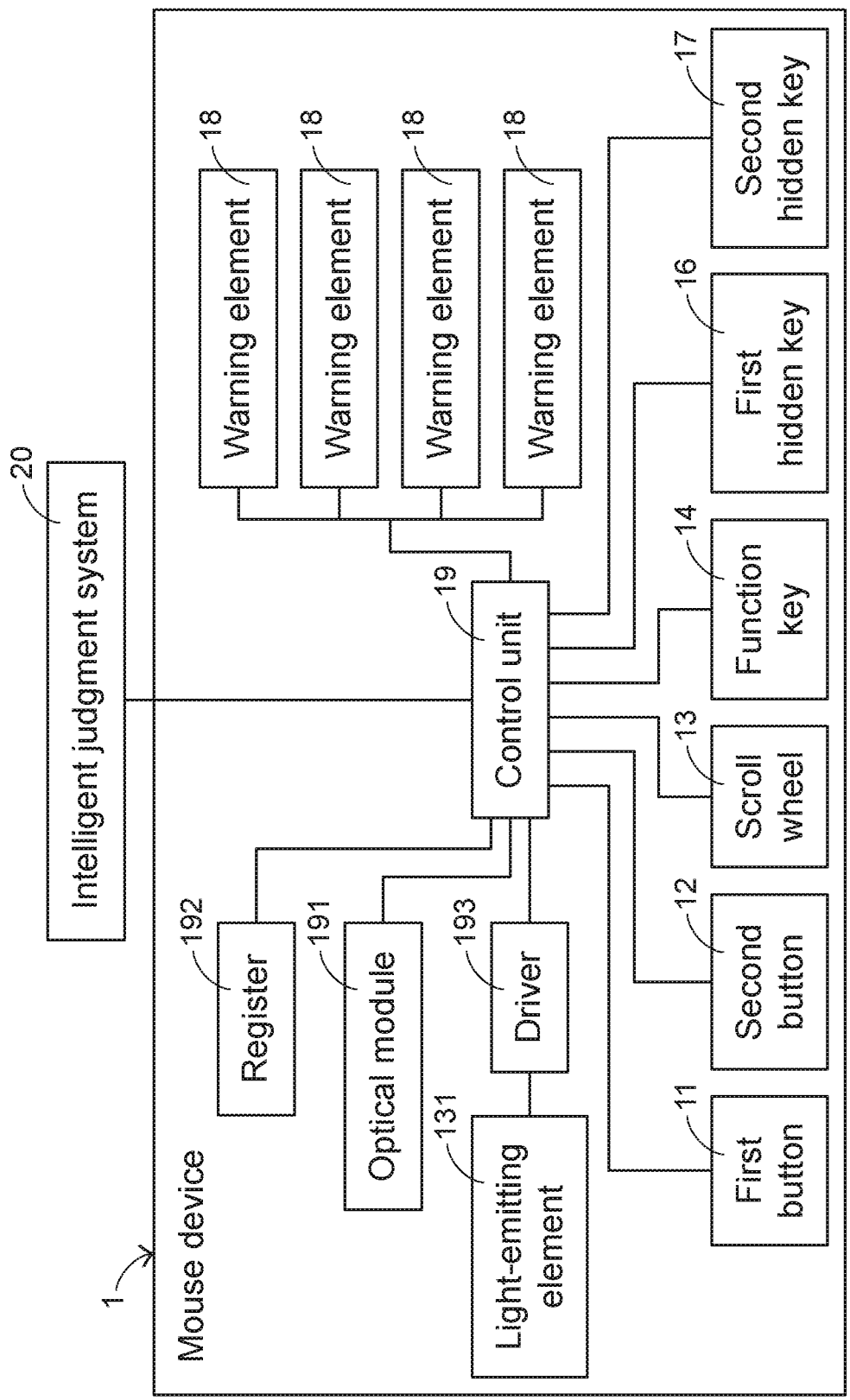
FIG. 3 is a schematic functional block diagram illustrating the inner components of the mouse device according to the embodiment of the present invention.

Please refer to FIGS. 1, 2 and 3. FIG. 1 is a schematic perspective view illustrating the structure of a mouse device according to an embodiment of the present invention and taken along a viewpoint. FIG. 2 is a schematic perspective view illustrating the structure of the mouse device according to the embodiment of the present invention and taken along another viewpoint. FIG. 3 is a schematic functional block diagram illustrating the inner components of the mouse device according to the embodiment of the present invention.

The mouse device 1 is in communication with a computer system (not shown). The computer system can be operated to play an electronic sports game. The mouse device 1 comprises a main body 10, a first button 11, a second button 12, a scroll wheel 13, plural function keys 14, an air cushion 15, a first hidden key 16, a second hidden key 17, plural warning elements 18 and a control unit 19.

The first button 11 is disposed on the main body 10 and located at a left side of the scroll wheel 13. When the first button 11 is pressed down by the user, a first button signal is generated. For example, the first button signal is set as a shooting function of the electronic sports game. Like the first button 11, the second button 12 is disposed on the main body 10 and located at a right side of the scroll wheel 13. When the second button 12 is pressed down by the user, a second button signal is generated. In this embodiment, the first button 11 is a left button, and the second button 12 is a right button.

The scroll wheel 13 is disposed on the main body 10 and partially exposed outside the main body 10. When the scroll wheel 13 is rotated by the user, a scrolling signal is generated. When the scroll wheel 13 is pressed down, a wheel button signal is generated. Preferably, a first light-emitting element 131 is disposed within the scroll wheel 13. The scroll wheel 13 is made of a transparent material or a translucent material. When the first light-emitting element 131 is driven to emit a light beam, the light beam is transmitted through the transparent or translucent scroll wheel 13. The illuminating effect of the scroll wheel 13 provides a first warning function.

The plural function keys 14 are located at two sidewalls of the main body 10. According to the practical requirements, the plural function keys 14 are set to provide specified functions. Preferably, the positions of the plural function keys 14 are specially designed to evade the user's palm. That is, the plural function keys 14 are not easily covered by the user's palm. Under this circumstance, the possibility of erroneously touching the function keys 14 will be minimized. Some examples of setting the functions of the function keys 14 will be described as follows. For example, a first one of the function keys 14 is set to have the function of the "Alt" key of the keyboard, which is pressed to execute a free look function of the electronic sports game. In addition, a second one of the function keys 14 is set to have the function of the "=" key of the keyboard, which is pressed to execute an auto run function of the electronic sports game. In addition, a third one of the function keys 14 is set to have the function of the "Tab" key of the keyboard, which is pressed to execute an inventory access function of the electronic sports game. In addition, a fourth one of the function keys 14 is set to have the function of the "M" key of the keyboard, which is pressed to execute a map displaying function of the electronic sports game. In other words, the plural function keys 14 can be used to replace the "Alt" key, the "=" key, the "Tab" key and the "M" key of the keyboard.

The air cushion 15 is located under the main body 10. Moreover, the air cushion 15 is contactable with a working surface (e.g., a desk surface). The air cushion 15 has the property of absorbing the vibration energy. When the user is much obsessed with the electronic sports game, the mouse device 1 is contacted with the working surface. The air cushion 15 provides the buffering efficacy. Consequently, the damage of the mouse device 1 caused by collision is avoided. Moreover, the use of the air cushion 15 can reduce the friction between the mouse device 1 and the working surface. In an embodiment, the air cushion 15 is made of a silicone material or a thermoplastic elastomer (TPE). Preferably, the air cushion is made of a light-transmissible silicone material or a light-transmissible thermoplastic elastomer (TPE). In this embodiment, the mouse device is equipped with a light-emitting element between the main body and the air cushion. After the light beam emitted by the light-emitting element is transmitted through the light-transmissible air cushion, the light beam is visible by the user and an additional prompt signal is provided.

The first hidden key 16 is arranged between the main body 10 and the air cushion 15 and not exposed outside. The first hidden key 16 is located at a left side of the main body 10. When the main body 10 is leaned to the left and pressed down, the first hidden key 16 is triggered to generate a first leaning signal. Similarly, the second hidden key 17 is arranged between the main body 10 and the air cushion 15 and not exposed outside. The second hidden key 17 is located at a right side of the main body 10. When the main body 10 is leaned to the right and pressed down, the second hidden key 17 is triggered to generate a second leaning signal. According to the settings of the mouse device 1, the function of leaning the left shoulder in the electronic sports game is executed in response to the first leaning signal from the first hidden key 16. Consequently, the first hidden key 16 can be used to replace the "Q" key of the keyboard. According to the settings of the mouse device 1, the function of leaning the right shoulder in the electronic sports game is executed in response to the second leaning signal from the second hidden key 17. Consequently, the second hidden key 17 can be used to replace the "E" key of the keyboard.

As mentioned above, the air cushion 15 is located under the main body 10. When the user's palm is leaned left to press down the main body 10, the left side of the air cushion 15 is compressed. That is, the mouse device 1 is leaned left and in a pressed state. Meanwhile, the user's palm is maintained at the gesture of normally operating the mouse device 1. Consequently, the mouse device 1 can be used to perform another operation. For example, when the user's palm is leaned left to press down the main body 10, the function of leaning the left shoulder is executed. Even if the mouse device 1 is leaned left and in the pressed state, the user may press down the first button 11. In the electronic sports game, the player performs the shooting action while leaning the left shoulder of the player. Since the function of leaning the left/right shoulder is executed by leaning the main body 10 of the mouse device 1 to the left/right side, the operation of the mouse device 1 is more intuitive. As mentioned above, the first hidden key 16 and the second hidden key 17 are arranged between the main body 10 and the air cushion 15. Consequently, while the first hidden key 16 and the second hidden key 17 are simultaneously pressed by the user and the main body 10 is moved, the movement of the cursor of the computer system is correspondingly controlled.

The plural warning elements 18 are disposed on the main body 10 in a distributed manner. In response to the received auxiliary signal, the warning elements 18 generate vibration effects to provide a second warning function. In an embodiment, the plural warning elements 18 are located at a top side, a bottom side, a left side and a right side of the main body 10, respectively. In an embodiment, the warning elements 18 are vibrators for providing a warning function in a vibration manner. It is noted that the examples of the warning elements are not restricted. For example, in another embodiment, the warning elements are light-emitting elements.

The control unit 19 is disposed within the main body 10. Moreover, the control unit 19 is electrically connected with the first button 11, the second button 12, the scroll wheel 13, the plural function keys 14, the first hidden key 16, the second hidden key 17 and the plural warning elements 18 for controlling operations of these components. When the first button 11 is pressed down, the first button 11 generates the first button signal to the control unit 19. In addition, the control command corresponding to the first button signal is transmitted from the control unit 19 to the computer system. According to the control command, the computer system performs the corresponding operation. When the second button 12 is pressed down, the second button 12 generates the second button signal to the control unit 19. In addition, the control command corresponding to the second button signal is transmitted from the control unit 19 to the computer system. According to the control command, the computer system performs the corresponding operation. When the scroll wheel 13 is rotated, the scroll wheel 13 generates the scrolling signal to the control unit 19. In addition, the control command corresponding to the scrolling signal is transmitted from the control unit 19 to the computer system. According to the control command, the computer system performs the corresponding operation. When one of the function keys 14 is pressed down, the function key 14 generates the predetermined function signal to the control unit 19. In addition, the control command corresponding to the predetermined function signal is transmitted from the control unit 19 to the computer system. When the first hidden key 16 is pressed down, the first hidden key 16 generates the first leaning signal to the control unit 19. In addition, the control command corresponding to the first leaning signal is transmitted from the control unit 19 to the computer system. When the second hidden key 17 is pressed down, the second hidden key 17 generates the second leaning signal to the control unit 19. In addition, the control command corresponding to the second leaning signal is transmitted from the control unit 19 to the computer system.

Moreover, for facilitating the user to play the game, the other function settings may be created by the control unit 19 according to the requirements of the user. For example, when the user intends to continuously execute the shooting function (i.e., a continuous shooting function), the first button 11 is quickly and continuously pressed down according to the function setting. However, while the first button 11 is quickly and continuously pressed down, the scroll wheel 13 is easily and erroneously touched and rotated by the user and the function of the scroll wheel 13 is enabled. As mentioned above, the function of changing weapons in the electronic sports game "Playerunknown's Battlegrounds" is executed by rotating the scroll wheel 13. If the scroll wheel is erroneously touched during the process of continuously shooting the enemies, the continuous shooting function is interrupted and the function of changing weapons is executed by the computer system. Under this circumstance, the character of the user is easily fought back by the enemies. For solving this problem, the control unit 19 is specially set. For example, when the control unit 19 detects that the first button 11 is quickly and continuously pressed down, the control unit 19 disables the function of the scroll wheel 13. Consequently, even if the scroll wheel 13 is erroneously touched, the function of changing weapons is not executed by the computer system. In a preferred embodiment, the functions of the scroll wheel, the "Tab" key and the "M" key which change the game screen to a large extent will be disabled by the control unit when the control unit 19 detects that the left button is quickly and continuously pressed down. Consequently, the problem of causing the malfunction will be avoided.

The mouse device 1 further comprises an optical module 191, a register 192 and a driver 193. The functions and operations of these components are well known to those skilled in the art, and are not redundantly described herein.

Moreover, the control unit 19 is electrically connected with an intelligent judgment system 20 in a wired communication manner or a wireless communication manner. The intelligent judgment system 20 is disposed outside the mouse device 1. The control unit 19 receives an auxiliary signal from the intelligent judgment system 20. In an embodiment, the intelligent judgment system 20 is installed in a cloud server (not shown) and electrically connected with the computer system and the mouse device 1 of the present invention. After the intelligent judgment system 20 reads the game screen and the game sound of the electronic sports game, the intelligent judgment system 20 acquires all information from the game screen. After the game screen and the game sound are analyzed, the intelligent judgment system 20 generates an auxiliary signal to the mouse device 1. Consequently, the mouse device 1 performs the corresponding warning operation. In another embodiment, the intelligent judgment system is installed in the computer system. Especially, the intelligent judgment system is a firmware component that is installed in the mouse device and electrically connected with the control unit. According to the encryption settings, the intelligent judgment system binds to the mouse device. Consequently, the intelligent judgment system is not embezzled by others.

In some embodiments, the mouse device 1 further comprises a surround-type light-emitting element, or the mouse device further comprises plural second light-emitting elements that are disposed on the periphery of the main body 10 in a surround arrangement. It is noted that the types of the light beams generated by the first light-emitting element 131 and the second light-emitting element are not restricted. In practice, the light beams generated by the first light-emitting element 131 and the second light-emitting element are the light beams with various colors or the light beams with various lighting effects (e.g., a flickering effect). In other words, the light beams with the lighting effects attracting the user's attention are feasible.

Hereinafter, the cooperation of the mouse device 1 and the intelligent judgment system 20 to play the electronic sports game "Playerunknown's Battlegrounds" will be described as follows. When the computer system starts to play the electronic sports game "Playerunknown's Battlegrounds", the intelligent judgment system 20 acquires the game screen and the game sound of the electronic sports game "Playerunknown's Battlegrounds". Some scenarios will be taken as examples.

Firstly, when the player controlled by the user approaches or enters a dangerous zone (e.g., the region inside a red zone or the region outside a blue zone), the intelligent judgment system 20 realizes that the player approaches or enters the dangerous zone according to the game screen. Consequently, the intelligent judgment system 20 transmits the corresponding auxiliary signal to the control unit 19. Through the driver 193, the first light-emitting element 131 within control unit 19 is driven to provide a first warning function by the control unit 19. For example, if the first light-emitting element 131 emits the red light beam, it means that the player approaches or enters the red zone. Whereas, if the first light-emitting element 131 emits the blue light beam, it means that the player approaches or enters the border of the blue zone.

Secondly, when a footstep sound effect is generated at the position near the player controlled by the user, the intelligent judgment system 20 recognizes the orientation of the footstep sound effect according to the game sound. Consequently, the intelligent judgment system 20 issues the auxiliary signal to the control unit 19. According to the auxiliary signal, the warning elements 18 are driven to generate vibration. For example, if the intelligent judgment system 20 judges that the footstep sound effect of the enemy in the electronic sports game comes from the left side, the auxiliary signal indicative of paying attention to the left side is transmitted from the intelligent judgment system 20 to the control unit 19. According to the auxiliary signal, the warning element 18 at the left side is driven to vibrate to warn the user that there is any enemy at the left side. For example, the warning elements 18 may be applied to the skydiving condition. If the intelligent judgment system 20 judges that the parachute is ready to be opened, the warning elements 18 produce vibration to provide the second warning function to warn the user of opening the parachute.

Thirdly, if the user intends to execute the inventory access function or execute the free look function, the intelligent judgment system 20 realizes that the user wants to execute the above two functions according to the game screen. These two functions are suitably applied to the high resolution situation of the mouse device 1 so as to be executed quickly. Under this circumstance, the auxiliary signal indicative of increasing the mouse resolution is transmitted from the intelligent judgment system 20 to the control unit 19. According to the auxiliary signal, the control unit 19 increases the resolution of the optical module 191 within the mouse device 1.

Fourthly, when the user intends to execute an aim function, the intelligent judgment system 20 realizes that the player controlled by the user wants to execute the aim function. The aim function is suitably applied to the low resolution situation of the mouse device 1 so as to be executed carefully. Under this circumstance, the auxiliary signal indicative of decreasing the mouse resolution is transmitted from the intelligent judgment system 20 to the control unit 19. According to the auxiliary signal, the control unit 19 decreases the resolution of the optical module 191 within the mouse device 1.

From the above descriptions, the mouse device of the present invention is specially designed according to the electronic sports game. For example, the positions of the plural function keys are specially determined, so that the problem of erroneously touching the function keys is avoided. In addition, the first hidden key and the second hidden key are arranged between the main body and the air cushion, so that the mouse device is operated more intuitive. Moreover, the function of the scroll wheel is disabled during the continuous shooting process, so that the problem of erroneously touching the scroll wheel is avoided. Moreover, the cooperation of the mouse device and the intelligent judgment system can provide various warning functions to facilitate the user to play the electronic sports game.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse device in communication with a computer system, the mouse device comprising:
    a main body;
    an air cushion located under the main body, and contactable with a working surface; and
    a first hidden key arranged between the main body and the air cushion, wherein the first hidden key is not exposed outside, and the first hidden key is located at a first side of the main body, wherein when the main body is leaned in a first direction and pressed down, the first hidden key is triggered to generate a first leaning signal;
    a control unit, which is connected with the computer system and the first hidden key, wherein after the control unit receives the first leaning signal, a control command corresponding to the first leaning signal is transmitted from the control unit to the computer system; and
    at least on warning element, which is disposed on the main body and electrically connected with the control unit, wherein when the at least one earning element is driven, a second warning function is provided.

2. The mouse device according to claim 1, wherein the mouse device further comprises a second hidden key, which is arranged between the main body and the air cushion, wherein the second hidden key is not exposed outside, and the second hidden key is located at a second side of the main body, wherein when the main body is leaned in a second direction and pressed down, the second hidden key is triggered to generate a second leaning signal.

3. The mouse device according to claim 1, wherein the mouse device further comprises a scroll wheel and a first light-emitting element disposed within the scroll wheel and electrically connected with the control unit, wherein the first light-emitting element emits a first light beam to provide a first warning function.

4. The mouse device according to claim 3, wherein the control unit is electrically connected with an intelligent judgment system, wherein after the intelligent judgment system reads a game information of an electronic sports game executed by the computer system and analyzes the game information, the intelligent judgment system generates an auxiliary signal and transmits the auxiliary signal to the control unit, wherein according to the auxiliary signal, the control unit drives the first light-emitting element to emit the first light beam to provide the first warning function.

5. The mouse device according to claim 1, wherein the mouse device further comprises plural second light-emitting elements, which are disposed on the main body, arranged around the main body and electrically connected with the control unit, wherein the second light-emitting elements emit plural second light beams to provide a third warning function.

6. The mouse device according to claim 1, wherein the mouse device further comprises an intelligent judgment system, which is electrically connected with the control unit, wherein after the intelligent judgment system reads a game information of an electronic sports game executed by the computer system and analyzes the game information, the intelligent judgment system generates an auxiliary signal and transmits the auxiliary signal to the control unit, wherein according to the auxiliary signal, the control unit enables the at least one warning element to provide the second warning function.

7. The mouse device according to claim 1, further comprising:
a scroll wheel disposed on the main body, partially exposed outside the main body, and electrically connected with the control unit, wherein when the scroll wheel is rotated, a scrolling signal is generated;
a first button disposed on the main body, located at a first side of the scroll wheel, and electrically connected with the control unit, wherein when the first button is pressed down, a first button signal is generated;
a second button disposed on the main body, located at a second side of the scroll wheel, and electrically connected with the control unit, wherein when the second button is pressed down, a second button signal is generated; and
a function key disposed on a sidewall of the main body and electrically connected with the control unit, wherein when the function key is pressed down, a predetermined function signal is generated.

8. The mouse device according to claim 7, wherein after the control unit receives the scrolling signal, a control command corresponding to the scrolling signal is transmitted from the control unit to the computer system, wherein after the control unit receives the first button signal, a control command corresponding to the first button signal is transmitted from the control unit to the computer system, wherein after the control unit receives the second button signal, a control command corresponding to the second button signal is transmitted from the control unit to the computer system, wherein after the control unit receives the predetermined function signal, a control command corresponding to the predetermined function signal is transmitted from the control unit to the computer system.

* * * * *